United States Patent
Kim et al.

(10) Patent No.: US 10,110,905 B2
(45) Date of Patent: Oct. 23, 2018

(54) TSM RATE-DISTORTION OPTIMIZING METHOD, ENCODING METHOD AND DEVICE USING THE SAME, AND APPARATUS FOR PROCESSING PICTURE

(71) Applicant: Industry-Academic Cooperation Foundation, Yonsei University, Seoul (KR)

(72) Inventors: Jaeseok Kim, Seoul (KR); YunPyo Hong, Seoul (KR); Juwon Byun, Seoul (KR); Young Jo Kim, Gyeonggi-do (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 668 days.

(21) Appl. No.: 14/625,160

(22) Filed: Feb. 18, 2015

(65) Prior Publication Data

US 2015/0245068 A1 Aug. 27, 2015

(30) Foreign Application Priority Data

Feb. 21, 2014 (KR) ........................ 10-2014-0020744

(51) Int. Cl.
*H04N 19/11* (2014.01)
*H04N 19/60* (2014.01)
(Continued)

(52) U.S. Cl.
CPC ......... *H04N 19/176* (2014.11); *H04N 19/127* (2014.11); *H04N 19/147* (2014.11); *H04N 19/60* (2014.11); *H04N 19/11* (2014.11)

(58) Field of Classification Search
None
See application file for complete search history.

(56) References Cited

U.S. PATENT DOCUMENTS

| 8,369,403 | B2 | 2/2013 | Horiuchi et al. |
| 8,687,699 | B1 * | 4/2014 | Wen ..................... H04N 19/176 |
| | | | 375/240.2 |

(Continued)

FOREIGN PATENT DOCUMENTS

| JP | 2007133167 | 5/2007 |
| KR | 10-2005-0067083 | 6/2005 |

(Continued)

OTHER PUBLICATIONS

Motra et al., "Fast Intra Mode Decision For HEVC Video Encoder", Sep. 11-13, 2012, Published in Software, Telecommunications and Computer Network (SoftCOM), 2012 20th International Conference, Added to IEEE Xplore database on Nov. 12, 2012.*

(Continued)

Primary Examiner — William C Vaughn, Jr.
Assistant Examiner — Joseph A Towe
(74) Attorney, Agent, or Firm — Procopio, Cory, Hargreaves & Savitch LLP

(57) ABSTRACT

Provided are a TSM rate-distortion optimizing method, encoding method and device using the same, and an image processing apparatus. The TSM rate-distortion optimizing method includes calculating a cost of each intra-prediction mode with respect to a block to be encoded using a sum of absolute values of differences between original pixels and reference pixels; selecting candidate modes of the intra-prediction modes according to the cost; calculating a TSM (Transform Skip Mode)-based rate-distortion cost according to the candidate modes; and comparing rate-distortion costs of the candidate modes and deciding a mode to be used for intra-prediction of the block.

10 Claims, 12 Drawing Sheets

(51) Int. Cl.
*H04N 19/127* (2014.01)
*H04N 19/176* (2014.01)
*H04N 19/147* (2014.01)

(56) References Cited

U.S. PATENT DOCUMENTS

2007/0177666 A1* 8/2007 Suman ................. H04N 19/139
375/240.12
2014/0169452 A1* 6/2014 Lim ..................... H04N 19/176
375/240.03

FOREIGN PATENT DOCUMENTS

| KR | 10-2009-0095316 | 9/2009 |
| KR | 10-2010-0059038 | 6/2010 |
| KR | 10-2013-0049709 | 5/2013 |

OTHER PUBLICATIONS

Lee et al., "A Fast Mode Decision Method Based on Motion Cost and Intra Prediction Cost for H.264/AVC", IEEE Transactions on Circuits and Systems for Video Technology, vol. 22, No. 3, Mar. 2012.*

Gabriellini, A., et al., Adaptive Transform Skipping for Improved Coding of Motion Compensated Residuals, Image Communications, 28, 2013, pp. 197-208.

Kim, Younhee, et al., A Fast Intra-Prediction Method in HEVC Using Rate-Distortion Estimation Based on Hadamard Transform, ETRI Journal, 35(2), Apr. 2013, pp. 270-280.

Kim, Y., et al., A Rough Mode Decision Algorithm for Transform Skip Mode in HEVC, The Institute of Electronics and Information Engineers, 51(8), Aug. 2014, pp. 1788-1797.

Notice of Allowance dated Apr. 29, 2016 from the Korean Patent Office (KIPO) in Korean Patent Application No. 10-2014-0020744.

* cited by examiner

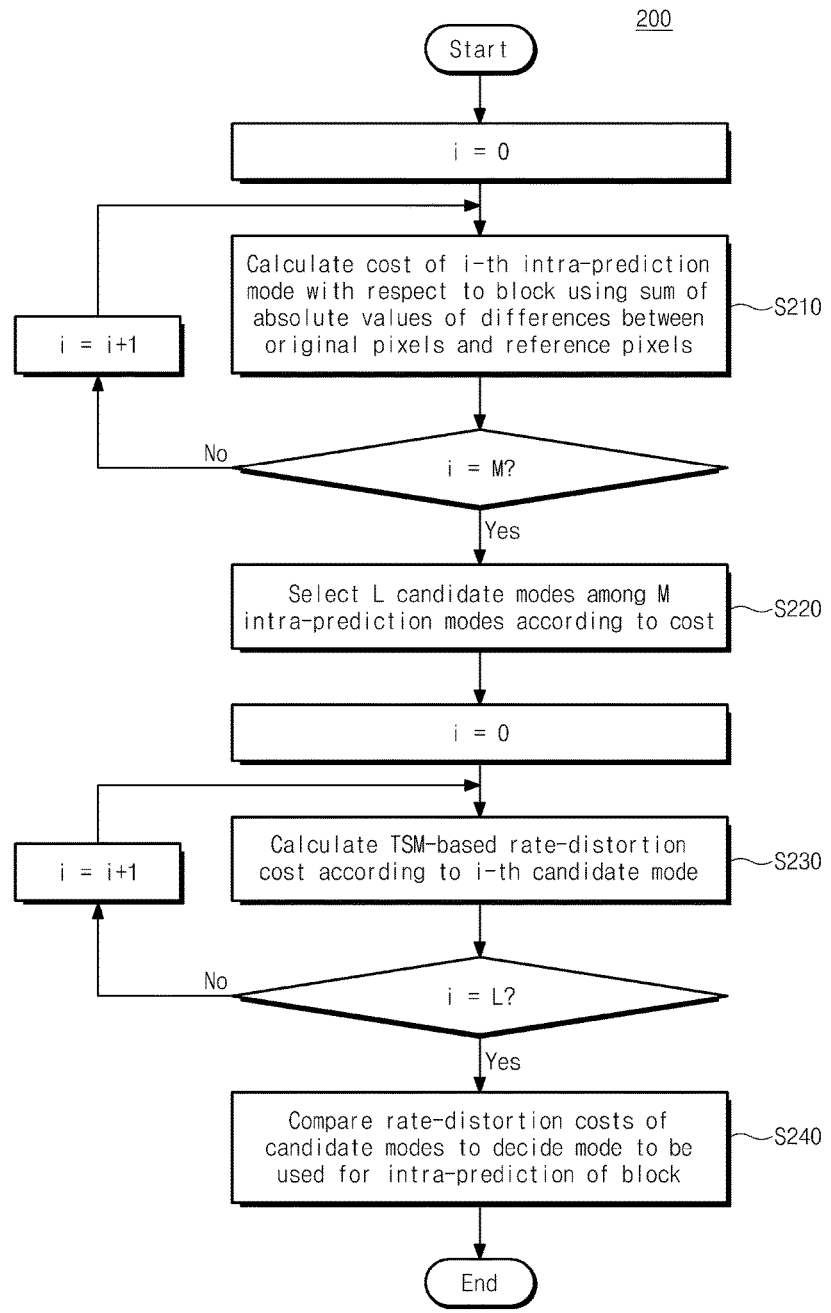

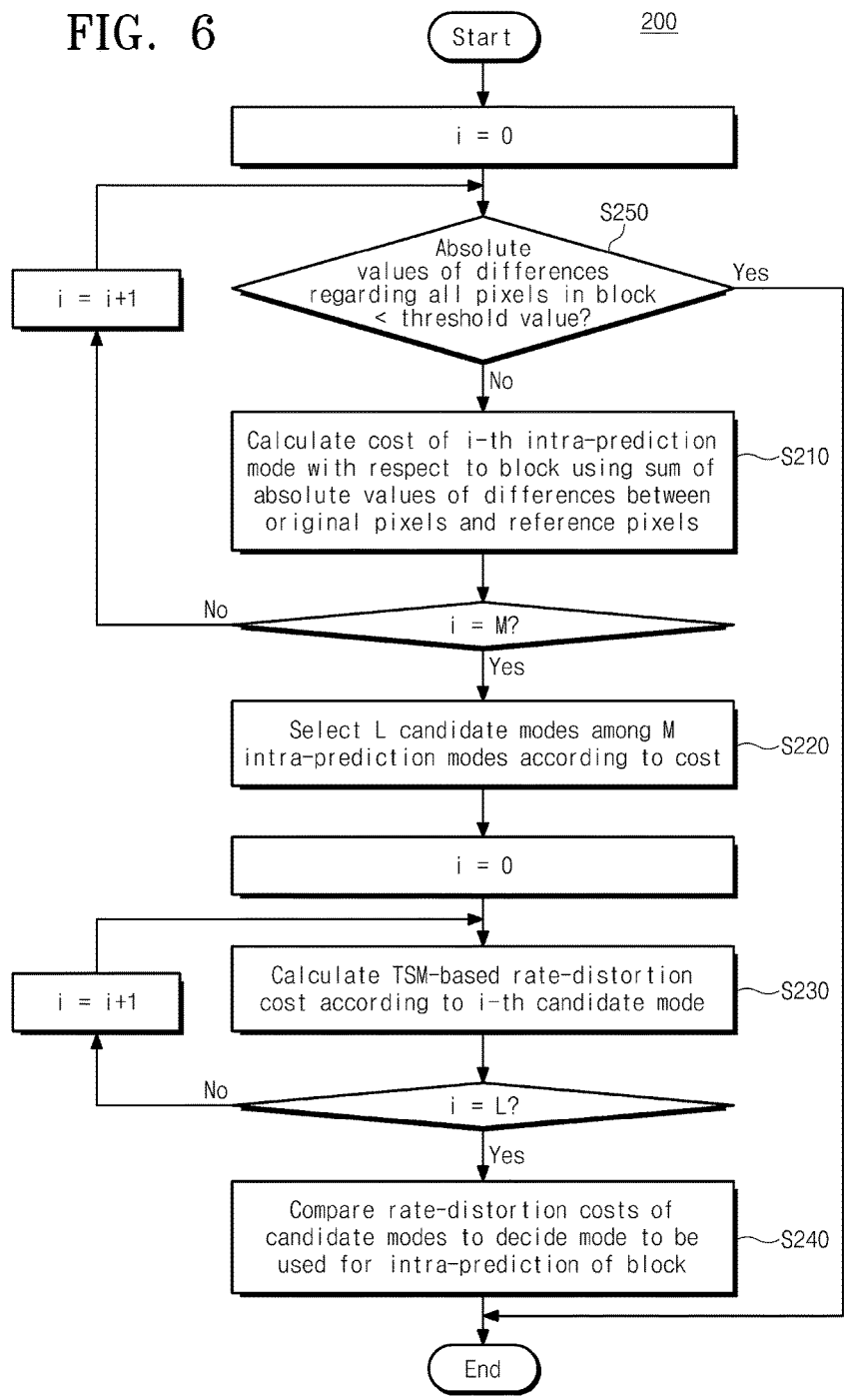

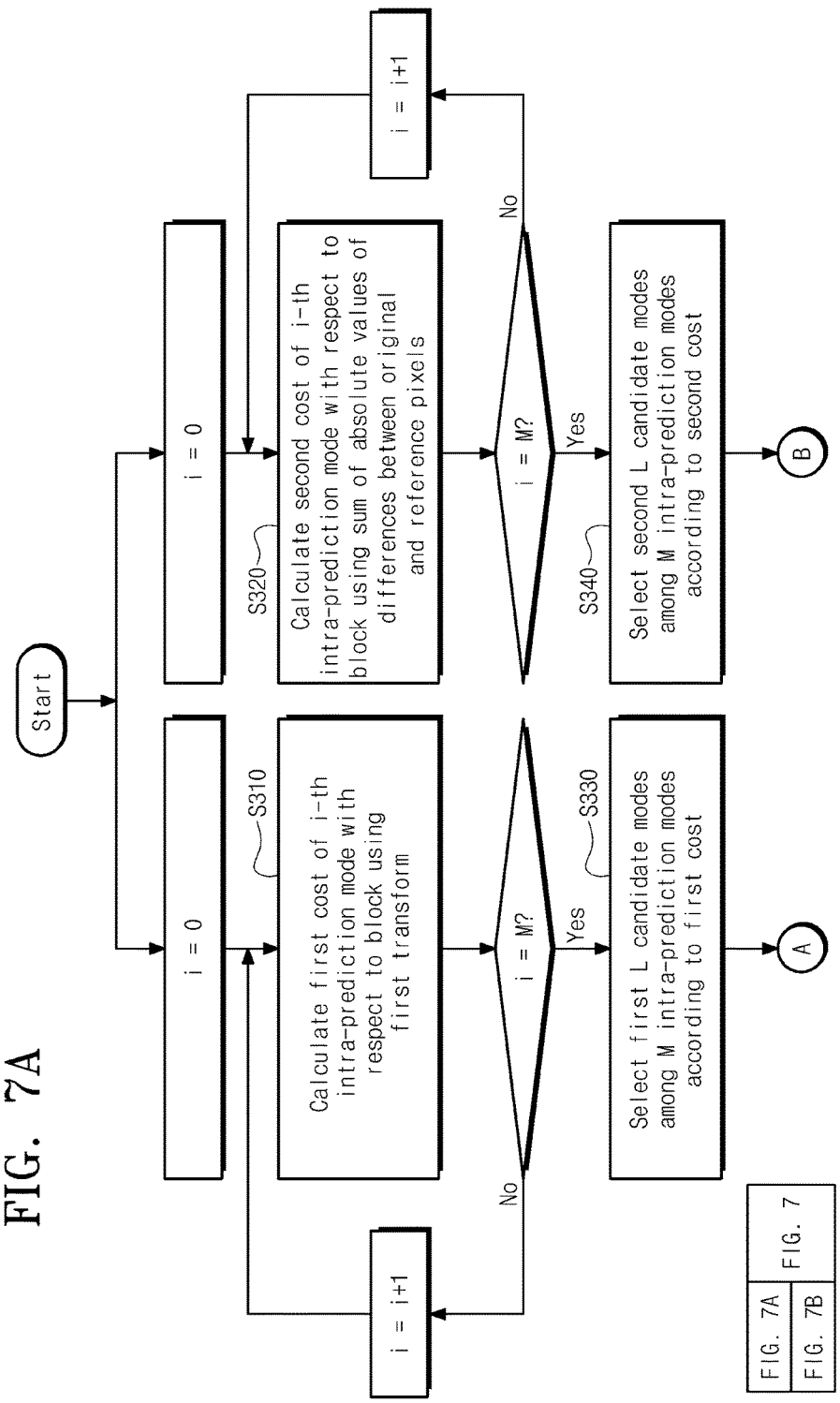

TSM RATE-DISTORTION OPTIMIZING METHOD, ENCODING METHOD AND DEVICE USING THE SAME, AND APPARATUS FOR PROCESSING PICTURE

CROSS-REFERENCE TO RELATED APPLICATIONS

A claim for priority under 35 U.S.C. § 119 is made to Korean Patent Application No. 10-2014-0020744 filed Feb. 21, 2014, in the Korean Intellectual Property Office, the entire contents of which are hereby incorporated by reference.

BACKGROUND

Embodiments of the inventive concepts described herein relate to a TSM rate-distortion optimizing method, encoding method and device using the same, and an image processing apparatus.

The standardization work on the HEVC (High Efficiency Video Coding) is currently in progress, and the HEVC introduces a Transform Skip Mode (TSM) to improve encoding efficiency of screen contents images that are substantially utilized for a cloud service.

A TSM encoding method is one of general encoding methods and maintains a lot of edges included in a screen contents image without performing transform (e.g., DCT or DST transform) as general encoding, thereby improving the quality of images and reducing a bit rate.

However, the HEVC does not provide an algorithm for selecting an intra-prediction mode for the TSM encoding separately. As a reference encoder of the HEVC, HM may apply a Rough Mode Decision (RMD) algorithm used at DCT-based encoding to select the intra-prediction mode for the TSM encoding.

The rough mode decision algorithm for the DCT-based encoding calculates a cost using the Hadamard transform having high correlation with the DCT transform. However, due to low correlation with the TSM encoding, the rough mode decision algorithm using the Hadamard transform is not appropriate to select the intra-prediction mode for the TSM encoding.

SUMMARY

Embodiments of the inventive concepts provide a TSM rate-distortion optimizing method, encoding method and device using the same, and an image processing apparatus capable of selecting an intra-prediction mode appropriate to TSM encoding.

Embodiments of the inventive concepts provide a TSM rate-distortion optimizing method, encoding method and device using the same, and an image processing apparatus capable of shortening a calculation time and improving a compression rate of an image including a lot of edges.

One aspect of embodiments of the inventive concept is directed to provide a TSM rate-distortion optimizing method which includes calculating a cost of each intra-prediction mode with respect to a block to be encoded using a sum of absolute values of differences between original pixels and reference pixels; selecting candidate modes of the intra-prediction modes according to the cost; calculating a TSM (Transform Skip Mode)-based rate-distortion cost according to the candidate modes; and comparing rate-distortion costs of the candidate modes and deciding a mode to be used for intra-prediction of the block The calculating of a cost may include applying the following cost function to each intra-prediction mode with respect to the block to calculate the cost, $$\text{Cost} = \sum_{i=1}^{N} (|P_{org}[i] - P_{pred}[i]|) + \lambda(QP) \cdot \text{Mode Bits}$$

wherein "N" is the number of pixels in the block, "$P_{org}[i]$" is a pixel value of each original pixel in the block, "$P_{pred}[i]$" is a pixel value of a reference pixel, "$\lambda$" is a Lagrange multiplier, "QP" is a quantization parameter, and "Mode Bits" is a bit depth.

The selecting of candidate modes may include selecting the predetermined number of modes of the intra-prediction modes according to an ascending order of a cost value.

The deciding of a mode to be used may include a mode, having a small rate-distortion cost, from among the candidate modes.

The selecting of candidate modes may further include excluding a relevant intra-prediction mode from the candidate modes when a sum of the absolute values of the differences is smaller than a predetermined threshold value.

The selecting of candidate modes may further include excluding a relevant intra-prediction mode from the candidate modes when the absolute values of the differences among all pixels in the block are smaller than a predetermined threshold value.

The calculating of a cost may further include terminating a TSM rate-distortion optimizing process when the absolute values of the differences are smaller than a predetermined threshold value.

The calculating of a cost may further include terminating a TSM rate-distortion optimizing process when the absolute values of the differences among all pixels in the block are smaller than a predetermined threshold value.

The threshold value may be set to be smaller as the number of bits required to encode a block in an intra-prediction mode becomes greater.

Another aspect of embodiments of the inventive concept is directed to provide an encoding method which includes calculating a first cost of each intra-prediction mode with respect to a block to be encoded using a first transform; calculating a second cost of each intra-prediction mode with respect to the block using a sum of absolute values of differences between original pixels and reference pixels; selecting first candidate modes of the intra-prediction modes according to the first cost; selecting second candidate modes of the intra-prediction modes according to the second cost; calculating a DCT (Discrete Cosine Transform)-based rate-distortion cost according to the first candidate modes; calculating a TSM-based rate-distortion cost according to the second candidate modes; and comparing rate-distortion costs of the first and second candidate modes and deciding a mode and an encoding method to be used for intra-prediction of the block The calculating of a first cost may include calculating a first cost of each intra-prediction mode with respect to the block using a Hadamard transform.

The calculating of a second cost may include applying the following cost function to each intra-prediction mode with respect to the block to calculate the second cost, $$\text{Cost} = \sum_{i=1}^{N} (|P_{org}[i] - P_{pred}[i]|) + \lambda(QP) \cdot \text{Mode Bits}$$

wherein "N" is the number of pixels in the block, "$P_{org}[i]$" is a pixel value of each original pixel in the block, "$P_{pred}[i]$" is a pixel value of a reference pixel, "λ" is a Lagrange multiplier, "QP" is a quantization parameter, and "Mode Bits" is a bit depth.

The selecting of first candidate modes may include selecting the predetermined number of modes of the intra-prediction modes according to an ascending order of a first cost value, and the selecting of second candidate modes may include selecting the predetermined number of modes of the intra-prediction modes according to an ascending order of a second cost value.

The deciding of a mode and an encoding method may include selecting a mode, having a smallest rate-distortion cost, from among the first and second candidates; and selecting one, corresponding to the selected mode, from among a DCT-based encoding method and a TSM-based encoding method.

The selecting of second candidate modes may further include excluding a relevant intra-prediction mode from the second candidate modes when a sum of the absolute values of the differences is smaller than a predetermined threshold value.

The selecting of second candidate modes may further include excluding a relevant intra-prediction mode from the second candidate modes when the absolute values of the differences among all pixels in the block are smaller than a predetermined threshold value.

The selecting of second candidate modes may further include terminating a TSM rate-distortion optimizing process when a sum of the absolute values of the differences is smaller than a predetermined threshold value The calculating of a second cost may include terminating TSM rate-distortion optimizing when the absolute values of the differences among all pixels in the block are smaller than a predetermined threshold value.

The threshold value may be set to be smaller as the number of bits required to encode a block in an intra-prediction mode becomes greater.

Still another aspect of embodiments of the inventive concept is directed to provide an encoding device which includes a cost calculating unit, a candidate mode selecting unit, a rate-distortion cost calculating unit, and a decision unit. The cost calculating unit may calculate a first cost of each intra-prediction mode with respect to a block to be encoded using a first transform and calculate a second cost of each intra-prediction mode with respect to the block using a sum of absolute values of differences between original pixels and reference pixels. The candidate mode selecting unit may select first candidate modes of the intra-prediction modes according to the first cost and select second candidate modes of the intra-prediction modes according to the second cost. The rate-distortion cost calculating unit may calculate a DCT-based rate-distortion cost according to the first candidate modes and calculate a TSM-based rate-distortion cost according to the second candidate modes. The decision unit may compare the rate-distortion costs of the first and second candidate modes to decide a mode and an encoding method to be used for intra-prediction of the block.

According to an exemplary embodiment of the inventive concept, it is possible to select an intra-prediction mode appropriate to TSM encoding.

According to an exemplary embodiment of the inventive concept, it is possible to shorten a calculation time and improve a compression rate of an image including a lot of edges.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 5 is a flowchart schematically illustrating a TSM rate-distortion optimizing method 200 according to an exemplary embodiment of the inventive concept;

FIG. 6 is a flowchart schematically illustrating a TSM rate-distortion optimizing method according to another exemplary embodiment of the inventive concept;

FIG. 7A-7B is a flowchart schematically illustrating an encoding method according to an exemplary embodiment of the inventive concept;

DETAILED DESCRIPTION

Figure 1:
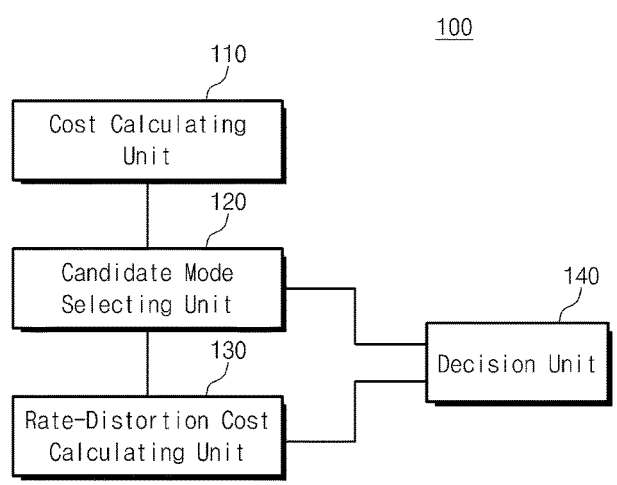
FIG. 1 is a block diagram schematically illustrating an encoding device 100 according to an exemplary embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a block diagram schematically illustrating an encoding device 100 according to an exemplary embodiment of the inventive concept.

As illustrated in FIG. 1, an encoding device 100 contains a cost calculating unit 110, a candidate mode selecting unit 120, a rate-distortion cost calculating unit 130, and a decision unit 140.

The cost calculating unit 110 calculates a first cost of each intra-prediction mode with respect to a block to be encoded using a first transform. The cost calculating unit 110 calculates a second cost of each intra-prediction mode with respect to the block using a sum of absolute values of differences between originals pixel and reference pixels.

The candidate mode selecting unit 120 selects first candidate modes of the intra-prediction modes according to the first cost and selects second candidate modes of the intra-prediction modes according to the second cost.

The rate-distortion cost calculating unit 130 calculates a DCT-based rate-distortion cost according to the first candidate modes and calculates a TSM-based rate-distortion cost according to the second candidate modes.

The decision unit 140 compares the rate-distortion costs of the first and second candidate modes to decide a mode and an encoding method to be used for intra-prediction of the block.

Figure 2:
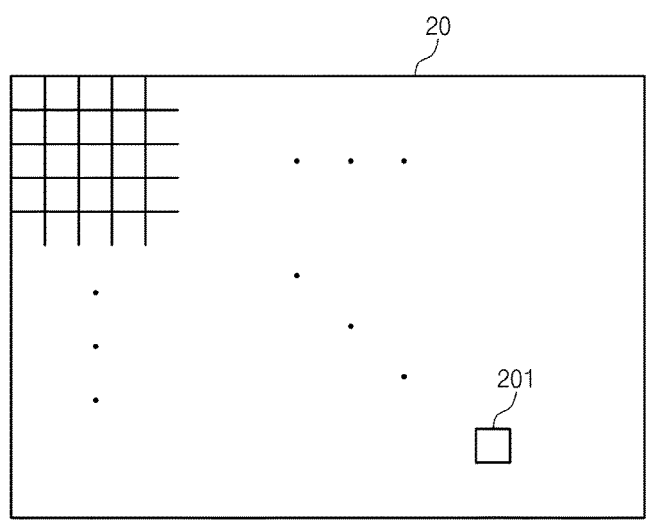
FIG. 2 is a diagram schematically illustrating an image and a block to be encoded, according to an exemplary embodiment of the inventive concept.

FIG. 2 is a diagram schematically illustrating an image 20 and a block 201 to be encoded, according to an exemplary embodiment of the inventive concept.

When an image 20 is input to an encoding device 100, it may be encoded in an intra-prediction mode or an inter-prediction mode. An intra-prediction method and an inter-prediction method are selectively applied to each block to decide an optimum prediction method on blocks constituting the image 20.

In FIG. 2, an embodiment of the inventive concept is exemplified as blocks to be encoded have the same size. However, the scope and spirit of the inventive concept may not be limited thereto. For example, sizes of to-be-encoded blocks in the image 20 may be different from each other according to an encoding algorithm.

Figure 3:
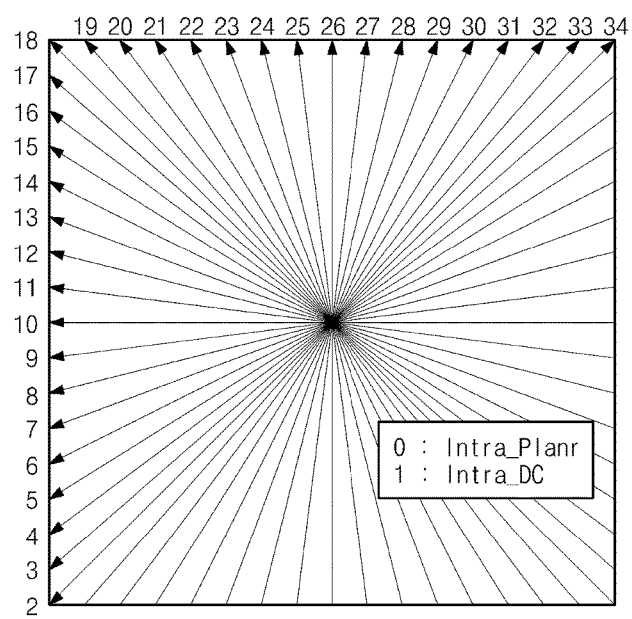
FIG. 3 is a diagram schematically illustrating a direction of an intra-prediction mode according to an exemplary embodiment of the inventive concept.

FIG. 3 is a diagram schematically illustrating a direction of an intra-prediction mode according to an exemplary embodiment of the inventive concept.

H.264 performs intra-prediction based on a total of 9 intra-prediction modes, while HEVC performs intra-prediction based on a total of 35 intra-prediction modes. In the event that an encoding device 100 encodes an image according to the HEVC, it selects one of 35 intra-prediction modes shown in FIG. 3 and performs intra-prediction according to the selected intra-prediction mode.

Also, as described above, the HEVC may further support TSM-based encoding as well as DCT-based encoding. If one mode is finally selected, one, corresponding to the selected mode, from among the TSM-based encoding and the DCT-based encoding is applied to the intra-prediction.

Figure 4:
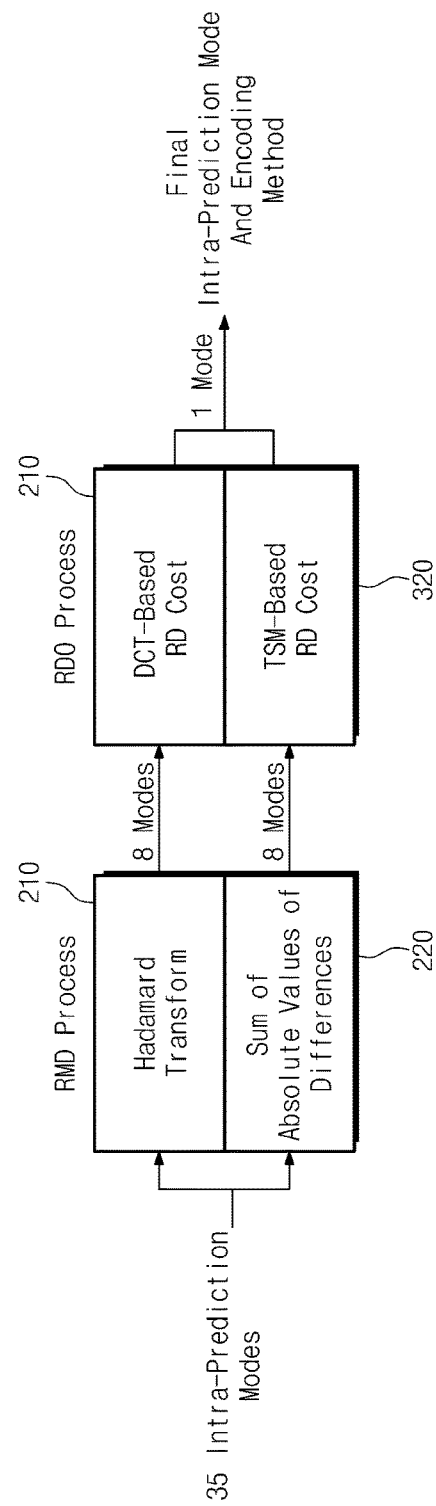
FIG. 4 is a diagram for describing a method for deciding a mode and an encoding method to be used for intra-prediction of a block, according to an exemplary embodiment of the inventive concept.

FIG. 4 is a diagram for describing a method for deciding a mode and an encoding method to be used for intra-prediction of a block, according to an exemplary embodiment of the inventive concept.

Referring to FIG. 4, when an encoding device 100 according to an exemplary embodiment of the inventive concept encodes an image 20 according to HEVC, it may determine one, providing optimum encoding efficiency, from among 35 intra-prediction modes and an encoding method through an RMD (Rough Mode Decision) process and an RDO (Rate Distortion Optimization) process.

The RMD process may include calculating a cost of each intra-prediction mode with respect to a block to be encoded using a predetermined cost function; and selecting the predetermined number of modes of candidate modes according to an ascending order of a cost value.

The RDO process may include calculating a rate-distortion cost based on the candidate modes, selecting a mode having the smallest rate-distortion cost, and deciding an encoding method corresponding to the selected mode as a method to be applied to intra-prediction.

In FIG. 4, an embodiment of the inventive concept is exemplified as the RDO process and the RMD process are independently performed.

A conventional RMD process is formed of a single process only using Hadamard transform, while an embodiment of the inventive concept calculates a cost having high correlation with the TSM-based encoding using a sum of absolute values of differences between original pixels and reference pixels in a block separately as well as the Hadamard transform having high correlation with the DCT-based encoding.

Accordingly, the RMD process according to an exemplary embodiment of the inventive concept that uses a sum of the absolute values of the differences may provide candidate modes suitable for the TSM-based, rather than a process using the Hadamard transform.

According to an exemplary embodiment of the inventive concept, a cost calculating unit 110 calculates a first cost of each intra-prediction mode with respect to a block to be encoded using the Hadamard transform (performed in 210 shown in FIG. 4).

The cost calculating unit 110 calculates a second cost by applying the following cost function to each intra-prediction mode with respect to the block (performed in 220 shown in FIG. 4).

$$\text{Cost} = \sum_{i=1}^{N} (|P_{org}[i] - P_{pred}[i]|) + \lambda(QP) \cdot \text{Mode Bits} \quad \text{[Equation 1]}$$

Here, "N" is the number of pixels in the block, "$P_{org}[i]$" is a pixel value of each original pixel in the block, and "$P_{pred}[i]$" is a pixel value of a reference pixel. "$\lambda$" is a Lagrange multiplier, "QP" is a quantization parameter, and "Mode Bits" is a bit depth.

According to an exemplary embodiment of the inventive concept, a candidate mode selecting unit 120 selects the predetermined number of modes of the intra-prediction modes according to an ascending order of a first cost value, as first candidate modes (performed in 210 shown in FIG. 4).

The candidate mode selecting unit 120 selects the predetermined number of modes of the intra-prediction modes according to an ascending order of a second cost value, as second candidate modes (performed in 220 shown in FIG. 4).

In FIG. 4, an embodiment of the inventive concept is exemplified as the candidate mode selecting unit 120 selects first eight candidate modes and second eight candidate modes of 35 intra-prediction modes according to an ascending order of first and second cost values. However, the scope and spirit of the inventive concept may not be limited thereto.

According to an exemplary embodiment of the inventive concept, a rate-distortion cost calculating unit 130 calculates a DCT-based rate-distortion cost according to the first candidate modes (performed in 310 shown in FIG. 4).

The rate-distortion cost calculating unit 130 calculates a TSM-based rate-distortion cost according to the second candidate modes (performed in 320 shown in FIG. 4).

Afterwards, a decision unit 140 compares rate-distortion costs of the first and second candidate modes to decide a mode and an encoding method to be used for intra-prediction of the block.

According to an exemplary embodiment, the decision unit 140 may determine a mode, having the smallest rate-distortion cost, from among the first and second candidate modes as a mode to be used in an intra-prediction mode of a block.

Also, the decision unit 140 may determine one, corresponding to the selected mode, from among the DCT-based encoding method and the TSM-based encoding method as an encoding method to be used in an intra-prediction mode of the block.

As described above, the encoding device 100 according to an exemplary embodiment of the inventive concept may be configured such that the RMD process is divided into two processes: a process for selecting candidate modes suitable for the DCT-based encoding and a process for selecting candidate modes suitable for the TSM-based encoding. Accordingly, it is possible to improve encoding efficiency of the TSM-based encoding method.

According to another exemplary embodiment of the inventive concept, the encoding device 100 compares an absolute value of a difference calculated from a block with a predetermined threshold value. Based on the comparison result, the encoding device 100 excludes a relevant intra-prediction mode from the second candidate modes or skips RMD and RDO processes (corresponding to 220 and 320 shown in FIG. 4) for TSM-based encoding.

As an example, the candidate mode selecting unit 120 may exclude a relevant intra-prediction mode from the second candidate modes when a sum of absolute values of differences calculated with respect to the block is smaller than a predetermined threshold value.

As another example, the candidate mode selecting unit 120 may exclude a relevant intra-prediction mode from the second candidate modes when absolute values of differences among all pixels in the block are smaller than a predetermined threshold value.

As still another example, the encoding device 100 may terminate a TSM rate-distortion optimizing (i.e., RDO) process when a sum of absolute values of differences calculated with respect to the block is smaller than a predetermined threshold value.

In this case, the encoding device 100 only compares rate-distortion costs of the first candidate modes to decide a mode to be used for intra-prediction of a block and to select a DCT-based encoding method as an encoding method to be used for the intra-prediction of a block. That is, the TSM-based encoding method may be excluded from the intra-prediction of the block.

As a further example, the encoding device 100 may terminate the TSM rate-distortion optimizing process when absolute values of differences among all pixels in the block are smaller than a predetermined threshold value.

In this case, the encoding device 100 only compares rate-distortion costs of the first candidate modes to decide a mode to be used for intra-prediction of a block. The encoding device 100 performs intra-prediction of a block using the DCT-based encoding method.

The threshold value may be set to be smaller as the number of bits required to encode a block in an intra-prediction mode, that is, a bit depth becomes greater.

For example, the following equation 2 shows a threshold value when a bit depth is "8", and the following equation 3 shows a threshold value when a bit depth is "10".

$$\text{Threshold}_{Bitdepth8}=0.5654\times\exp(0.1176\times QP) \quad \text{[Equation 2]}$$

$$\text{Threshold}_{Bitdepth10}=0.4802\times\exp(0.1206\times QP) \quad \text{[Equation 3]}$$

As described above, a TSM rate-distortion optimizing process is terminated in a predetermined case using a predetermined threshold value, thereby shortening a computation time without lowering encoding efficiency.

FIG. 5 is a flowchart schematically illustrating a TSM rate-distortion optimizing method 200 according to an exemplary embodiment of the inventive concept.

As illustrated in FIG. 5, a TSM rate-distortion optimizing method 200 includes calculating a cost of each intra-prediction mode with respect to a block to be encoded using a sum of absolute values of differences between original pixels and reference pixels (S210); selecting candidate modes of the intra-prediction modes according to the cost (S220); calculating a TSM-based rate-distortion cost according to the candidate modes (S230); and comparing rate-distortion costs of the candidate modes and deciding a mode to be used for intra-prediction of the block (S240).

The TSM rate-distortion optimizing method 200 shown in FIG. 5 may be performed in blocks 220 and 320 shown in FIG. 4.

According to an embodiment, the calculating of a cost (S210) may include applying a cost function (refer to the equation 1) to each intra-prediction mode with respect to the block to calculate a cost.

According to an embodiment, the selecting of candidate modes (S220) may include selecting the predetermined number of modes of the intra-prediction modes according to an ascending order of a cost value.

According to an embodiment, the deciding of a mode to be used (S240) may include a mode, having a small rate-distortion cost, from among the candidate modes.

According to another embodiment, the selecting of candidate modes (S220) may further include excluding a relevant intra-prediction mode from the candidate modes when a sum of the absolute values of the differences is smaller than a predetermined threshold value.

According to still another embodiment, the selecting of candidate modes (S220) may further include excluding a relevant intra-prediction mode from the candidate modes when the absolute values of the differences among all pixels in the block are smaller than a predetermined threshold value.

FIG. 6 is a flowchart schematically illustrating a TSM rate-distortion optimizing method 200 according to another exemplary embodiment of the inventive concept.

As illustrated in FIG. 6, a TSM rate-distortion optimizing method 200 according to another exemplary embodiment of the inventive concept further includes terminating a TSM rate-distortion optimizing process when absolute values of differences among all pixels in a block are smaller than a predetermined threshold value (S250).

In other words, according to this embodiment, when absolute values of differences between original pixels and reference pixels in all pixels included in a block to be encoded are smaller than the predetermined threshold value, the TSM rate-distortion optimizing process is no longer performed.

According to another embodiment, the TSM rate-distortion optimizing process is terminated when a sum of absolute values of differences between original pixels and reference pixels in the block is smaller than a predetermined threshold value.

The threshold value may be set to be smaller as the number of bits required to encode a block in an intra-prediction mode, that is, a bit depth becomes greater.

For example, a threshold value may be set according to the equation 2 when a bit depth is "8", and a threshold value may be set according to the equation 3 when a bit depth is "10".

Figure 7B:
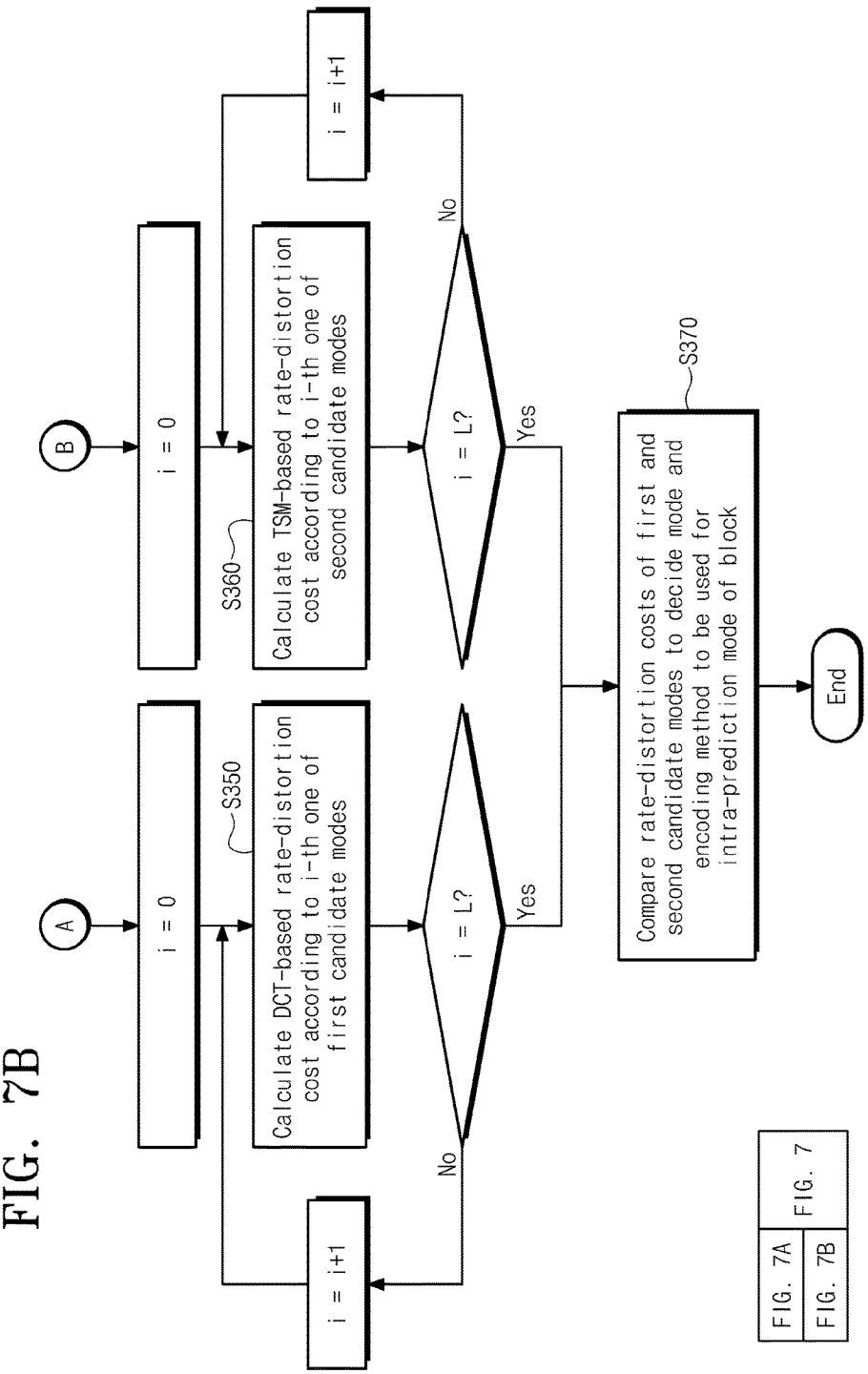

FIG. 7A-7B is a flowchart schematically illustrating an encoding method 300 according to an exemplary embodiment of the inventive concept.

An encoding method 300 may make it possible to perform rate-distortion optimizing for DCT-based encoding and rate-distortion optimizing for TSM-based encoding independently. Here, the rate-distortion optimizing for the TSM-based encoding may correspond to an above-described TSM rate-distortion optimizing method 200.

For example, as illustrated in FIG. 7A-7B, the encoding method 300 includes calculating a first cost of each intra-prediction mode with respect to a block to be encoded using a first transform (S310); calculating a second cost of each intra-prediction mode with respect to the block using a sum of absolute values of differences between original pixels and reference pixels (S320); selecting first candidate modes of the intra-prediction modes according to the first cost (S330); selecting second candidate modes of the intra-prediction modes according to the second cost (S340); calculating a DCT-based rate-distortion cost according to the first candidate modes (S350); calculating a TSM-based rate-distortion cost according to the second candidate modes (S360); and comparing rate-distortion costs of the first and second candidate modes and deciding a mode and an encoding method to be used for intra-prediction of the block (S370).

According to an embodiment, the calculating of a first cost (S310) may include calculating a first cost of each intra-prediction mode with respect to the block using a Hadamard transform.

According to an embodiment, the calculating of a second cost (S320) may include calculating a second cost of the block by applying a cost function (refer to equation 1) to each intra-prediction mode.

According to an embodiment, the selecting of first candidate modes (S330) may include selecting the predetermined number of modes of the intra-prediction modes according to an ascending order of a first cost value.

According to an embodiment, the selecting of second candidate modes (S340) may include selecting the predetermined number of modes of the intra-prediction modes according to an ascending order of a second cost value.

According to an embodiment, the deciding of a mode and an encoding method (S370) may include selecting a mode, having a smallest rate-distortion cost, from among the first and second candidates; and selecting one, corresponding to the selected mode, from among the DCT-based encoding method and the TSM-based encoding method.

As an example, the DCT-based encoding method is selected as the encoding method to be used for intra-prediction of the block when an intra-prediction mode belonging to the first candidate modes has a minimum rate-distortion cost.

As another example, the TSM-based encoding method is selected as the encoding method to be used for intra-prediction of the block when an intra-prediction mode belonging to the second candidate modes has a minimum rate-distortion cost.

According to an embodiment, the selecting of second candidate modes (S340) may further include excluding a relevant intra-prediction mode from the second candidate modes when a sum of the absolute values of the differences is smaller than a predetermined threshold value.

According to another embodiment, the selecting of second candidate modes (S340) may further include excluding a relevant intra-prediction mode from the second candidate modes when the absolute values of the differences among all pixels in the block are smaller than a predetermined threshold value.

Figure 8A:
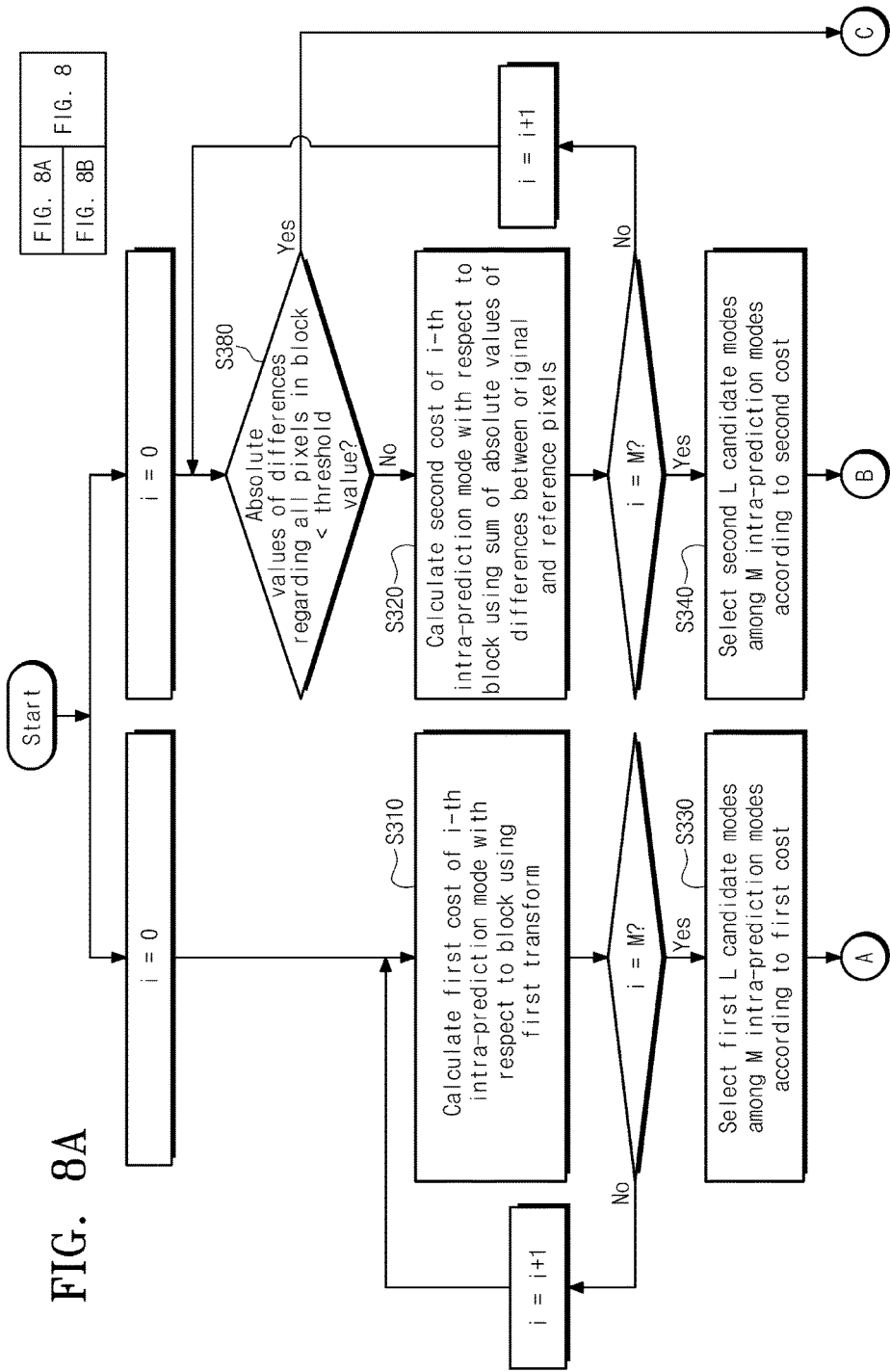
FIG. 8A-8B is a flowchart schematically illustrating an encoding method according to another exemplary embodiment of the inventive concept.
Figure 8B:
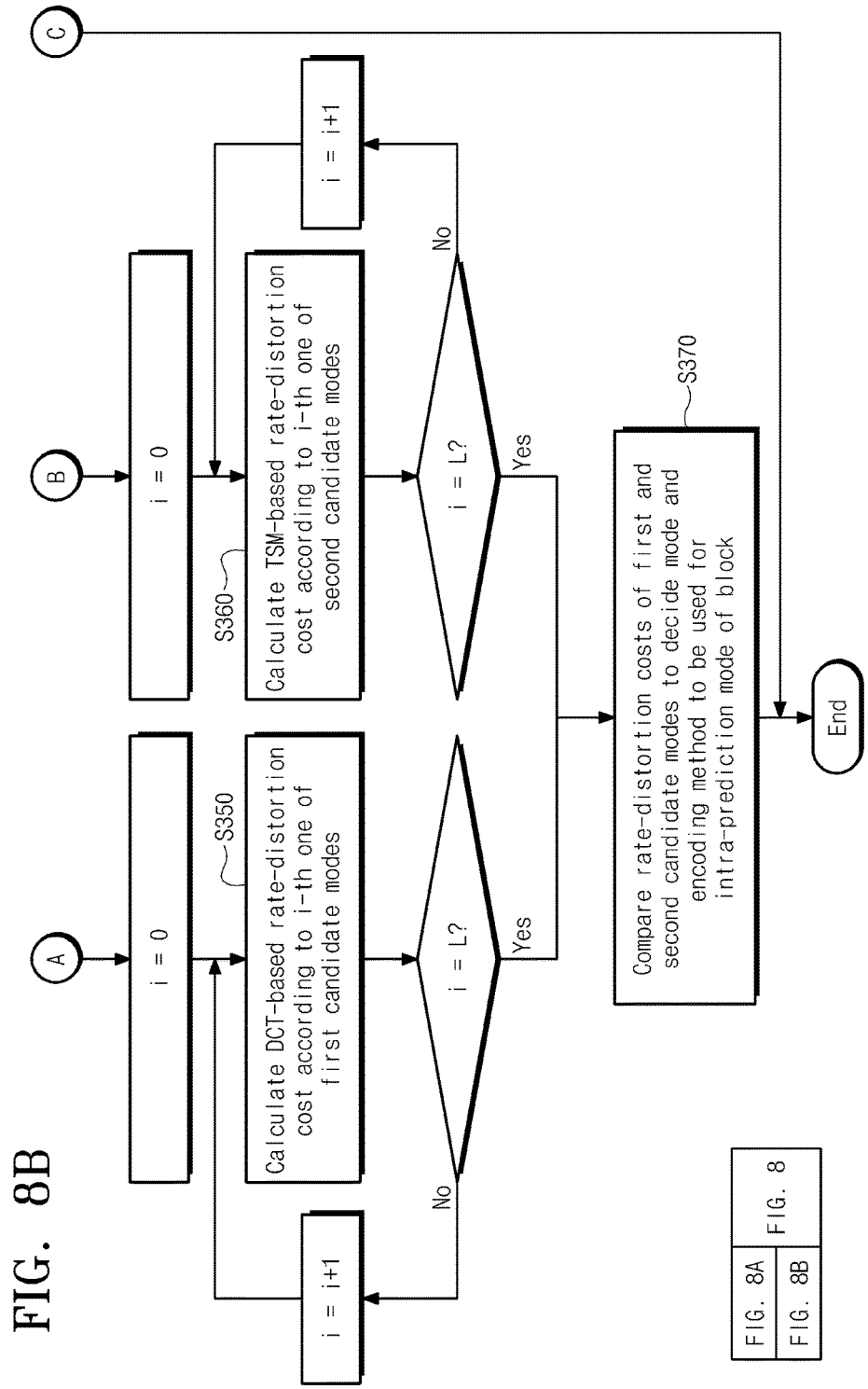

FIG. 8A-8B is a flowchart schematically illustrating an encoding method 300 according to another exemplary embodiment of the inventive concept.

As illustrated in FIG. 8A-8B, an encoding method 300 according to another exemplary embodiment of the inventive concept further includes terminating a TSM rate-distortion optimizing process when absolute values of differences among all pixels in a block are smaller than a predetermined threshold value (S380).

According to another embodiment, the encoding method 300 according to another exemplary embodiment of the inventive concept further includes terminating a TSM rate-distortion optimizing process when a sum of absolute values of differences between original pixels and reference pixels in the block is smaller than a predetermined threshold value.

The threshold value may be set to be smaller as the number of bits required to encode a block in an intra-prediction mode, that is, a bit depth becomes greater.

Embodiments of the inventive concept are described based on the HEVC. However, an image encoding technique to which encoding device and method are applied may be applied to any other image encoding techniques using a TSM-based encoding algorithm, not limited to the HEVC.

Accordingly, the number of intra-prediction modes, the number of candidate numbers, etc. may be changed or modified according to an image encoding technique to which an embodiment of the inventive concept is applied.

Figure 9:
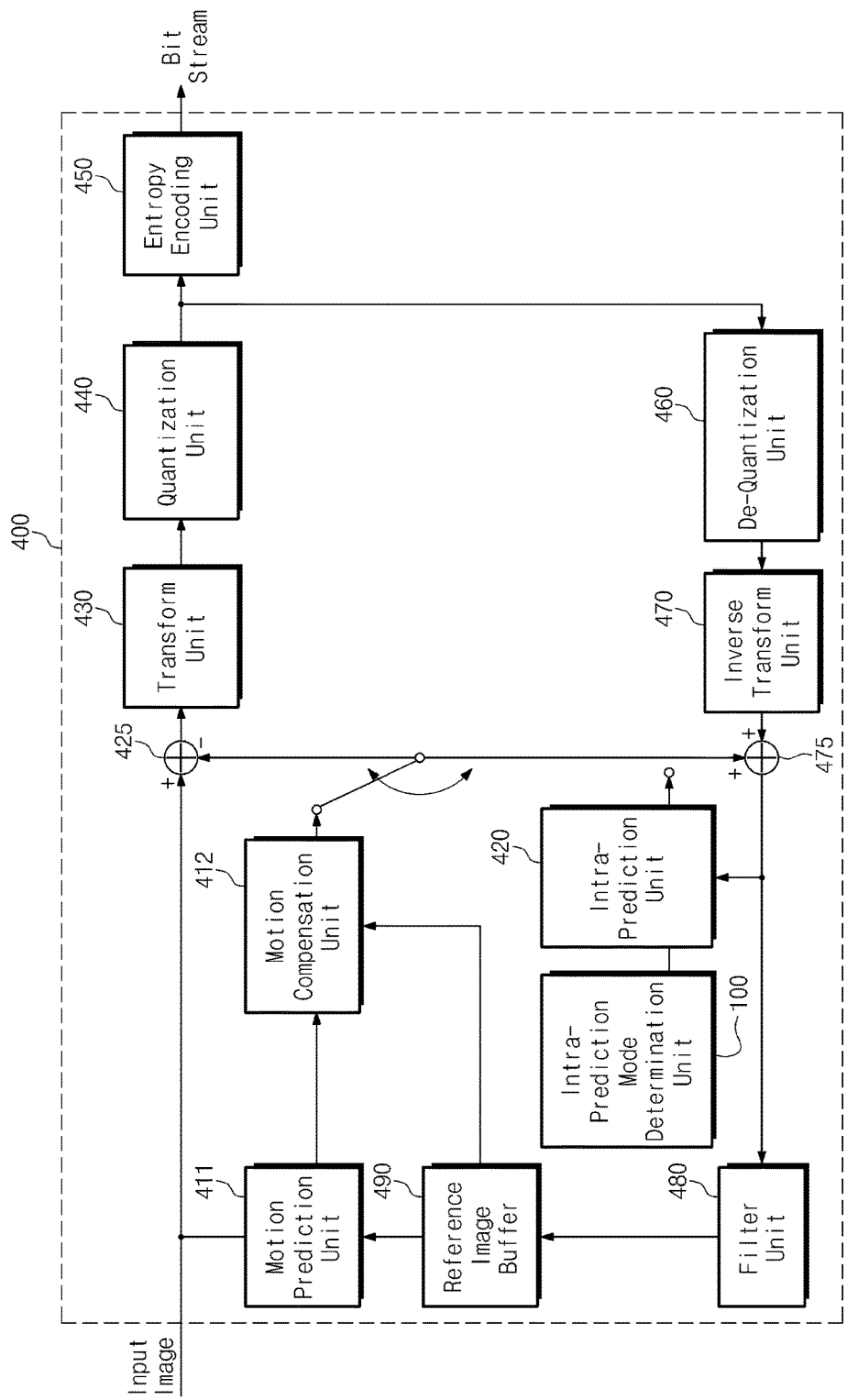
FIG. 9 is a block diagram schematically illustrating an image encoding device 400 according to an exemplary embodiment of the inventive concept.

FIG. 9 is a block diagram schematically illustrating an image encoding device 400 according to an exemplary embodiment of the inventive concept.

Referring to FIG. 9, an image encoding device 400 contains a motion prediction unit 411, a motion compensation unit 412, an intra-prediction unit 420, a switch 415, a subtractor 425, a transform unit 430, a quantization unit 440, an entropy encoding unit 450, a de-quantization unit 460, an inverse transform unit 470, an adder 475, a filter unit 480, and a reference image buffer 490.

The image encoding device 400 performs encoding in an intra-prediction mode or an inter-prediction mode with respect to an input image and outputs a bit stream as the encoding result. An intra-prediction method and an inter-predication method on a prediction unit are selectively used to decide an optimum prediction method on the prediction unit. After generating a prediction block on an original block of the input image, the image encoding device 400 encodes a difference between the original block and a prediction block.

For the intra-prediction mode, an intra-prediction mode deciding unit 100 decides a mode and an encoding method to be used for intra-prediction, and the intra-prediction unit 420 performs spatial prediction using pixel values of a previously encoded block adjacent to a current block based on the decided mode and encoding method and generates a prediction block as the spatial prediction result.

The intra-prediction mode deciding unit 100 may correspond to an encoding device according to an exemplary embodiment of the inventive concept.

For an inter-screen prediction mode, upon predicting a motion, the motion prediction unit 411 searches for a region, best matched with the input block, from among a reference image stored at the reference image buffer 490, and it obtains a motion vector as the searching result. The motion compensation unit 412 generates the prediction block by performing motion compensation using the motion vector.

The subtractor 425 generates a residual block using a difference between the input block and the generated prediction block. The transform unit 430 performs transform on the residual block to output a transform coefficient. The quantization unit 440 quantizes the transform coefficient according to a quantization parameter and outputs a quantized coefficient. The entropy encoding unit 450 outputs a bit stream by entropy encoding the quantized coefficient according to a probability distribution.

Since HEVC performs inter-prediction encoding, a currently encoded image needs to be decoded and stored so as to be used as a reference image. Accordingly, the quantized coefficient is de-quantized through the de-quantization unit 460 and is inversely transformed through the inverse transform unit 470. A restore block is generated as a coefficient, which is de-quantized and inversely transformed, and the prediction block are added through the adder 475.

The restore block goes through the filter unit 480, and the filter unit 480 applies at least one or more of a deblocking filter, an SAO (Sample Adaptive Offset), and an ALF (Adaptive Loop Filter) to the restore block or a restore picture. The filter unit 480 is called "adaptive in-loop filter". The deblocking filter eliminates block distortion occurring at a boundary between blocks. The SAO adds an appropriate offset value to a pixel value to compensate for a coding error. The ALF performs filtering based on a result of comparing the restored image and the original image and performs it only if high efficiency is applied. The restore block going through the filter unit 480 is stored at the reference image buffer 490.

Figure 10:
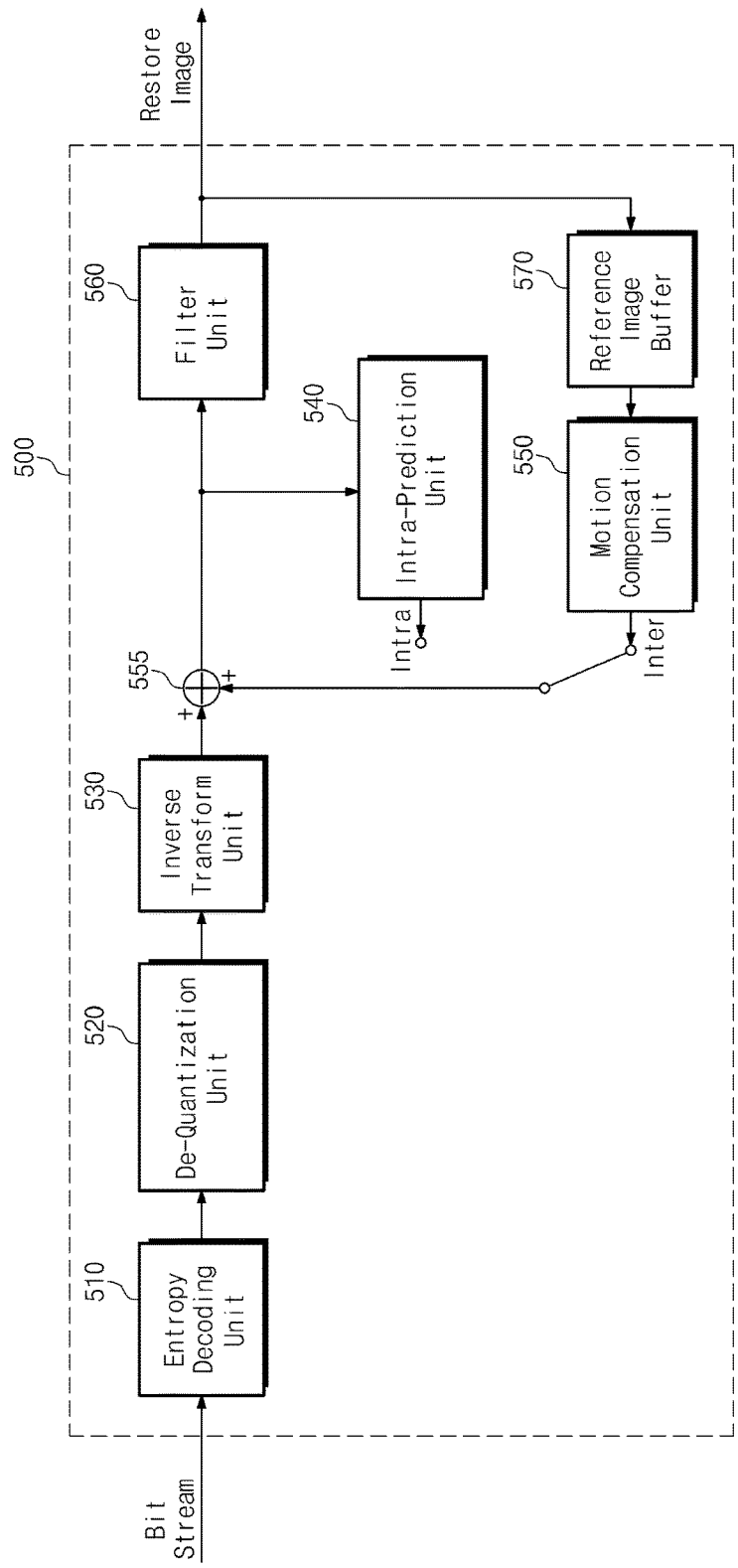
FIG. 10 is a block diagram schematically illustrating an image decoding device according to an exemplary embodiment of the inventive concept.

FIG. 10 is a block diagram schematically illustrating an image decoding device 500 according to an exemplary embodiment of the inventive concept.

Referring to FIG. 10, an image decoding device 500 contains an entropy decoding unit 510, a de-quantization unit 520, an inverse transform unit 530, an intra-prediction unit 540, a motion compensation unit 550, a filter unit 560, and a reference image buffer 570.

The image decoding device 500 receives a bit stream from an encoder and performs decoding in an intra-mode or an inter-mode to output a reconstructed image, that is, a restore image. For the inter-mode, a prediction block is generated using an inter-screen prediction mode. For the inter-mode, a prediction block is generated using an inter-screen prediction method. After obtaining a residual block from the bit stream and generating the prediction block, the image decoding device 500 adds the residual block and the prediction block to generate a reconstructed block, that is, a restore block.

The entropy encoding unit 510 outputs quantized coefficient by entropy decoding the input bit stream according to a probability distribution. The quantized coefficient is de-quantized through the de-quantization unit 520 and then is inversely transformed through the inverse transform unit

530. The residual block is generated as a result of de-quantizing and inversely transforming the quantized coefficient.

For an intra-prediction mode, the intra-prediction unit 540 performs spatial prediction using pixel values of a previously decoded block adjacent to a current block to generate a prediction block.

For an inter-prediction mode, the motion compensation unit 550 generates a prediction block by performing motion compensation using a motion vector and a reference image stored at the reference image buffer 570.

The residual block and the prediction block are added through the adder 555, and a resultant block goes through the filter unit 560. The filter unit 560 applies at least one or more of a deblocking filter, an SAO (Sample Adaptive Offset), and an ALF (Adaptive Loop Filter) to the restore block or a restore picture. The filter unit 560 outputs a reconstructed image, that is, a restore image. The restore image may be stored at the reference image buffer 570 and used for inter-prediction.

An encoding method according to an exemplary embodiment of the inventive concept is implemented to be suitable for a function of each module described with reference to FIGS. 9 and 10. That is, the encoding method according to an exemplary embodiment of the inventive concept may be performed through components included in an image encoder and an image decoder described with reference to FIGS. 9 and 10. The term "component" may also include a software process unit executable through an algorithm, as well as a hardware meaning.

Also, a TSM rate-distortion optimizing method and an encoding method according to an exemplary embodiment of the inventive concept may be implemented by a program executable on a computer and may be stored at a recording/storage medium. A computer-readable storage medium may include all sorts of storage devices in which data readable by a computer system is stored. The computer-readable storage medium may be a ROM, a RAM, a CD-ROM, a magnetic tape, a floppy disk, an optical data storage device, etc.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An encoding method comprising:
    performing a RMD (Rough Mode Decision) process comprising calculating a first cost of each intra-prediction mode with respect to a block to be encoded using a Hadamard transform and
    calculating a second cost of each intra-prediction mode with respect to the block using a sum of absolute values of differences between original pixels and reference pixels;
    selecting first candidate modes of the intra-prediction modes according to the first cost;
    selecting second candidate modes of the intra-prediction modes according to the second cost;
    performing a RDO (Rate Distortion Optimization) process comprising calculating a DCT (Discrete Cosine Transform)-based rate-distortion cost according to the first candidate modes; and
    calculating a TSM (Transform Skip Mode)-based rate-distortion cost according to the second candidate modes;
    and
    comparing the rate-distortion costs of the first and second candidate modes and deciding a mode and an encoding method to be used for intra-prediction of the block,
    wherein the RMD process is divided into two steps of calculating using the Hadamard transform and calculating using the sum of absolute values of differences between original pixels and reference pixels.

2. The encoding method of claim 1, wherein the calculating of a second cost comprises:
    applying the following cost function to each intra-prediction mode with respect to the block to calculate the second cost, $$\text{Cost} = \sum_{i=1}^{N} (|P_{org}[i] - P_{pred}[i]|) + \lambda(QP) \cdot \text{Mode Bits}$$

wherein "N" is the number of pixels in the block, "Porg[i]" is a pixel value of each original pixel in the block, "Ppred[i]" is a pixel value of a reference pixel, "λ" is a Lagrange multiplier, "QP" is a quantization parameter, and "Mode Bits" is a bit depth.

3. The encoding method of claim 1, wherein the selecting of first candidate modes comprises selecting a predetermined number of modes among the intra-prediction modes according to an ascending order of a first cost value, and
    wherein the selecting of second candidate modes comprises selecting a predetermined number of modes among the intra-prediction modes according to an ascending order of a second cost value.

4. The encoding method of claim 1, wherein the deciding of a mode and an encoding method comprises:
    selecting a mode having the smallest rate-distortion cost from among the first and second candidates; and
    selecting one, corresponding to the selected mode, from among a DCT-based encoding method and a TSM-based encoding method.

5. The encoding method of claim 1, wherein the selecting of second candidate modes further comprises:
    excluding a corresponding intra-prediction mode from the second candidate modes when a sum of the absolute values of the differences is smaller than a predetermined threshold value.

6. The encoding method of claim 1, wherein the selecting of second candidate modes further comprises:
    excluding a corresponding intra-prediction mode from the second candidate modes when the absolute values of the differences of all pixels in the block are smaller than a predetermined threshold value.

7. The encoding method of claim 1, wherein the selecting of second candidate modes further comprises:
    terminating a TSM rate-distortion optimizing process when a sum of the absolute values of the differences is smaller than a predetermined threshold value.

8. The encoding method of claim 1, wherein the calculating of a second cost comprises:
    terminating TSM rate-distortion optimizing when the absolute values of the differences of all pixels in the block are smaller than a predetermined threshold value.

9. The encoding method of claim 5, wherein the threshold value is set to be smaller as the number of bits required to encode a block in an intra-prediction mode becomes greater.

10. An encoding device comprising:

a processor deciding a mode and an encoding method to be used for intra-prediction of a block to be encoded, wherein the processor is configured to:

perform a RMD (Rate Distortion Optimization) process comprising calculating a first cost of each intra-prediction mode with respect to the block to be encoded using a Hadamard transform and calculating a second cost of each intra-prediction mode with respect to the block using a sum of absolute values of differences between original pixels and reference pixels, select first candidate modes of the intra-prediction modes according to the first cost and select second candidate modes of the intra-prediction modes according to the second cost, perform a RDO (Rate Distortion Optimization) process comprising calculating a DCT (Discrete Cosine Transform)-based rate-distortion cost according to the first candidate modes and calculating a TSM (Transform Skip Mode)-based rate-distortion cost according to the second candidate modes, and compare the rate-distortion costs of the first and second candidate modes to decide the mode and the encoding method to be used for intra-prediction of the block, wherein the RMD process is divided into two steps of calculating using the Hadamard transform and calculating using the sum of absolute values of differences between original pixels and reference pixels.

* * * * *